United States Patent

Takeuchi

[11] Patent Number: 6,145,873
[45] Date of Patent: *Nov. 14, 2000

[54] AIR BELT DEVICE

[75] Inventor: Hiroyuki Takeuchi, Hikone, Japan

[73] Assignee: Takata Corporation, Tokyo, Japan

[*] Notice: This patent is subject to a terminal disclaimer.

[21] Appl. No.: 09/145,273

[22] Filed: Sep. 2, 1998

[30] Foreign Application Priority Data

Sep. 2, 1997 [JP] Japan ................................. 9-236907

[51] Int. Cl.⁷ .................................................. B60R 21/18
[52] U.S. Cl. ............................................................ 280/733
[58] Field of Search .................................. 280/733, 807, 280/801.1

[56] References Cited

U.S. PATENT DOCUMENTS

| | | | |
|---|---|---|---|
| 3,791,670 | 2/1974 | Lucore et al. | 280/733 |
| 3,801,156 | 4/1974 | Granig | 280/733 |
| 3,874,694 | 4/1975 | Stephenson | 280/733 |
| 3,929,348 | 12/1975 | Lawwill | 280/733 |
| 6,019,388 | 2/2000 | Okazaki et al. | 280/733 |

FOREIGN PATENT DOCUMENTS

| | | |
|---|---|---|
| 2 681 558 | 3/1993 | France . |
| 5-85301 | 4/1993 | Japan . |
| 2 269 791 | 2/1994 | United Kingdom . |

*Primary Examiner*—Paul N. Dickson
*Attorney, Agent, or Firm*—Foley & Lardner

[57] ABSTRACT

An air belt device constructed to release gas downward or sideways when a gas generator is activated in the state a tongue is separated away from a buckle. A duct (24) and inflator (26) are provided within a casing (30) of the buckle (10). A plug (22) is fit vertically movable to the upper end of the duct (24). The plug (22) can not move vertically when the socket (20) is inserted, but it can move when the socket (20) is not inserted. When the inflator (26) operates with the tongue (12) not fastened, gas is released downward from the release port (50).

5 Claims, 12 Drawing Sheets

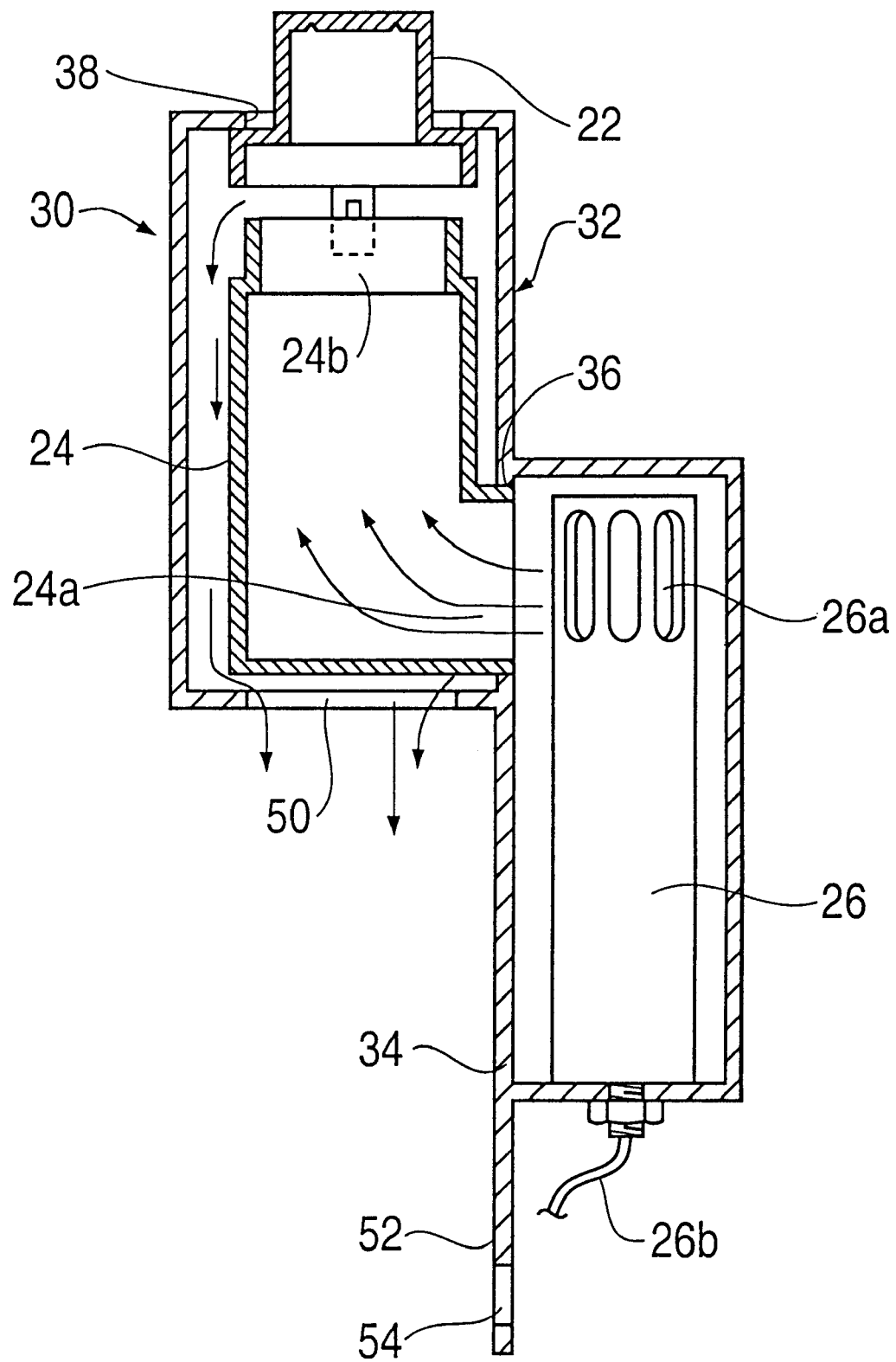

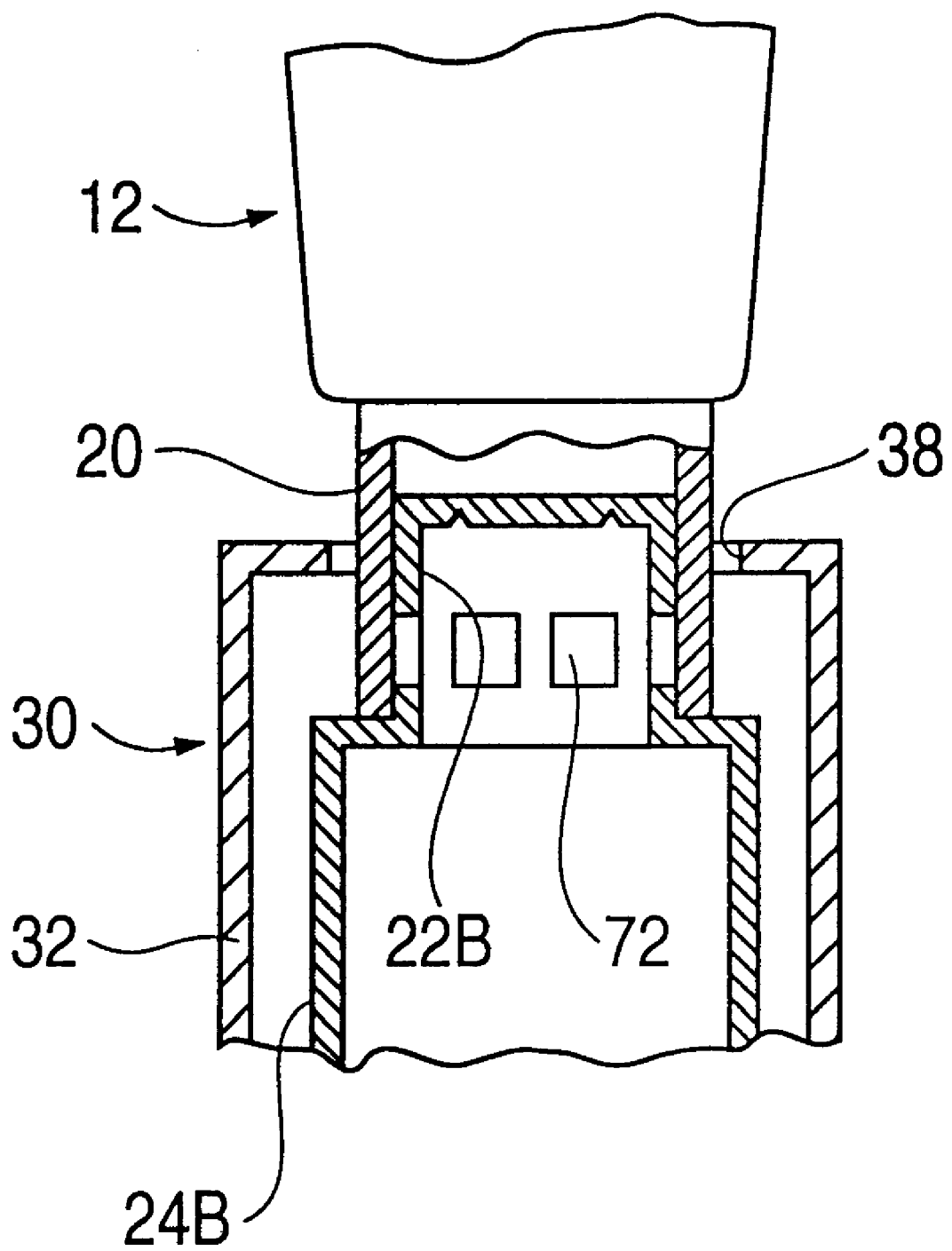

AIR BELT DEVICE

BACKGROUND OF THE INVENTION

The present invention relates to a seat belt device to protect a driver and passenger upon a collision, and specifically to an air belt device with a part of the seat belt made like a bag that is inflated by the gas supplied from a gas generator. More specifically, this invention relates to an air belt device with a safety measure for malfunctions of the gas generator.

Air belt devices have been known as disclosed by the Japanese Unexamined Pat. Publication No. 85301, etc. FIG. 12 (*a*) is a general perspective view of the air belt device of this Pat. publication and FIG. 12 (*b*) is a cross sectional view along the line B—B of FIG. 12 (*a*).

The air belt device 1 comprises a shoulder belt 2 which extends from right to left of a driver and passenger, a wrap belt 3 which extends from right to left of a driver and passenger, a buckle 4 which is provided on a vehicle floor, a tongue 5 which is inserted into the buckle 4 when fastening the air belt, and an intermediate guide 6 to guide the shoulder belt 2.

The shoulder belt 2 comprises a normal belt 2*a* similar to a prior common seat belt and a bag-like belt 2*b* connected to one end of the normal belt 2*a*. The normal belt 2*a* is movably guided by the intermediate guide 6. The other end of the normal belt 2*a* is connected to a seat belt retractor (ELR) 7 with an emergency lock device fixed to a vehicle body. The normal belt 2*a* can be taken up around the seat belt retractor 7.

The bag-like belt 2*b* is positioned to contact on a driver and is connected to the tongue 5 in another end opposite to the end connected to the normal belt 2*a*.

The wrap belt 3 is made of a normal belt similar to a common seat belt with one end fastened to the tongue 5 while the other end is secured to the seat belt retractor (ELR) 8 fixed to a vehicle body. Further, the buckle 4 is coupled with the gas generator 9 which operates upon an emergency such as a vehicle impact and ejects a high pressure gas.

The tongue 5 and buckle 4 have a passage to lead the gas from the gas generator 9 to the bag-like belt 2*b*.

The main part 2*c* of the bag-like belt 2*b* of the shoulder belt 2 is, as indicated by a solid line in FIG. 12 (*b*), normally held like a belt by holding the main part 2*c*, covering it by a cover 2*d* and sewing up at both ends 2*e*. When the gas generator 9 is activated, the sewed up ends 2*e* of the cover 2*d* are easily separated by inflation of the shoulder belt 2 and the bag-like belt 2*b* expands as indicated by an alternate long and two short dashes line. In the prior air belt device 1 described above, when the gas generator 9 is activated while the tongue 5 is not inserted into the buckle 4, gas is ejected upward from the buckle 4.

SUMMARY OF THE INVENTION

An object of the present invention is to release gas sideways or downward when the gas generator is activated while the tongue is separated from the buckle in such an air belt device.

According to the present invention, an improved air belt device is proposed. The air belt device includes a seat belt for protecting a passenger, said seat belt having at least in a portion thereof a bag-like belt that is connected to a tongue detachably coupled to a buckle, wherein gas is supplied to the bag-like belt from a gas supplying device through gas passages respectively formed within the buckle and the tongue. The air belt device is characterized by gas discharging means for discharging the gas, supplied from the gas supplying means, to a position below or beside the buckle when the gas supplying device is set in motion in case the tongue is detached from the buckle.

With the air belt device of the present invention, gas is released downward or sideways from the buckle when the gas generator is activated while the tongue is separated from the buckle, so that a blast of gas can not hit the driver and passenger.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

The accompanying drawings, which are incorporated in and constitute a part of the specification, illustrate a presently preferred exemplary embodiment of the invention, and, together with the general description given above and the detailed description of the preferred embodiment given below, serve to explain the principles of the invention.

The present invention will be more particularly described with reference to the accompanying drawings, in which FIG. 1 is a perspective view of the first embodiment of the present invention.

FIG. 4 is a vertical cross sectional view of the buckle of the first embodiment in the operating state.

Figure 5A:
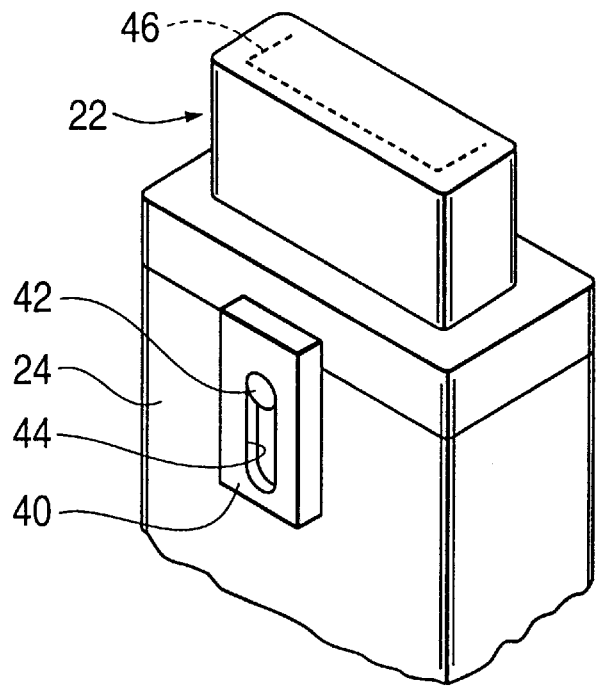
Figure 5B:
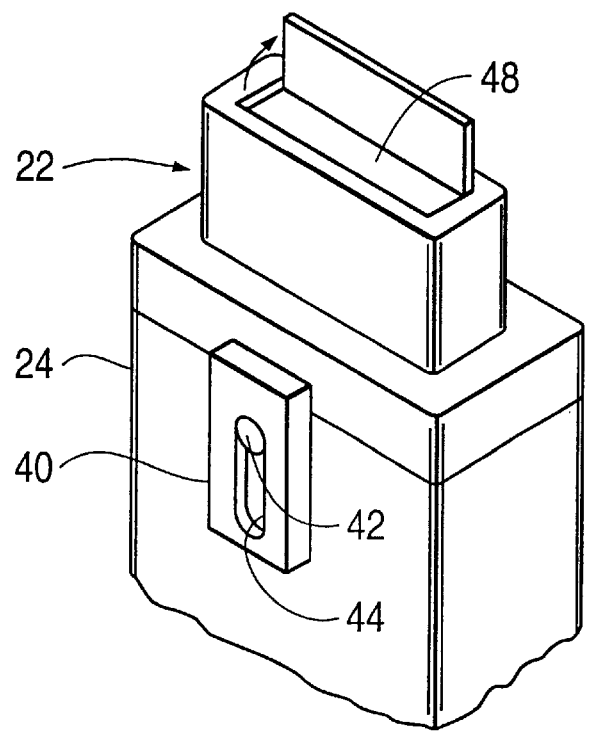

FIGS. 5(*a*) and 5(*b*) are perspective views of the duct and plug of the first embodiment.

Figure 6:
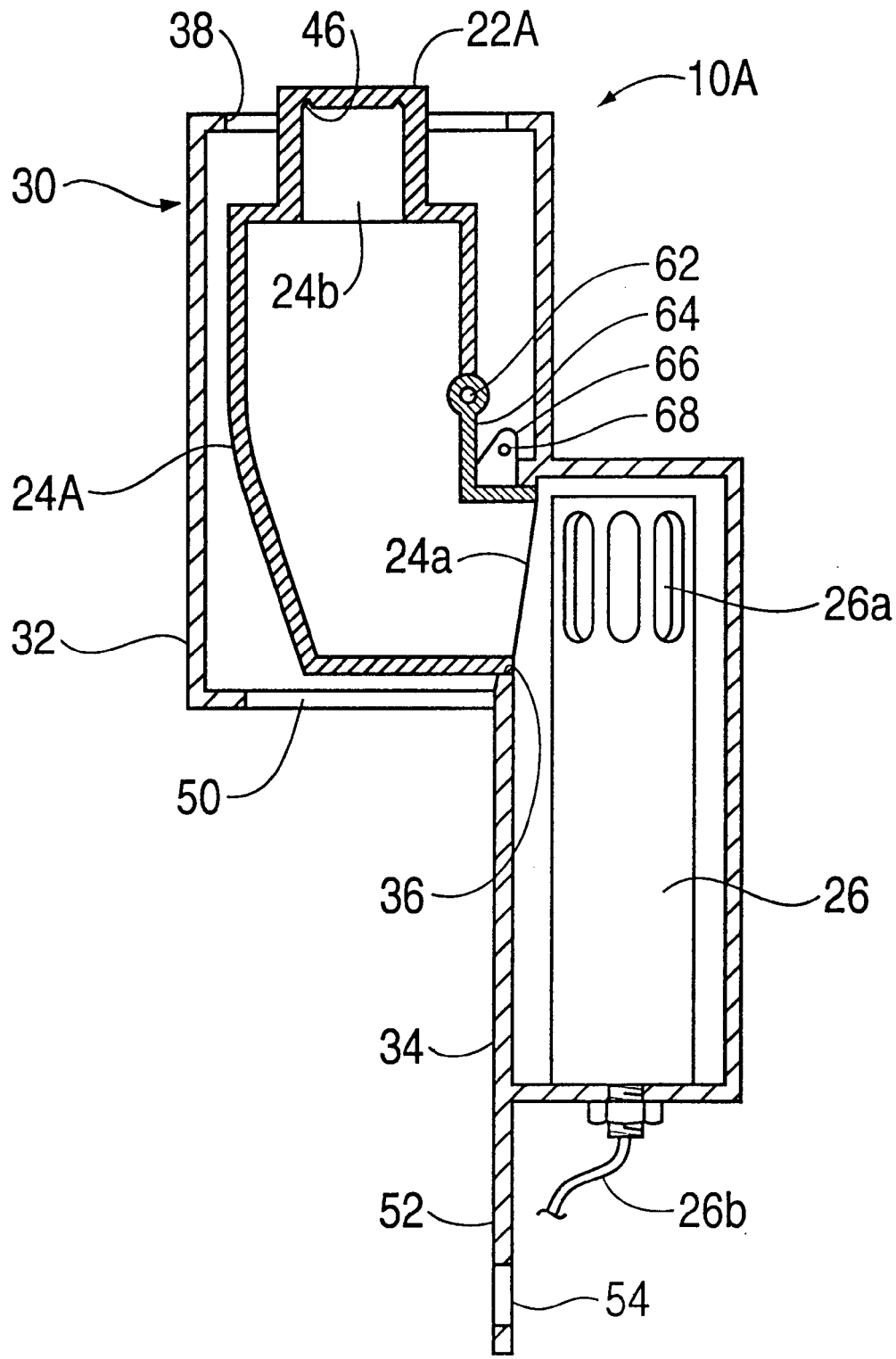

FIG. 6 is a vertical cross sectional view of the buckle of the second embodiment of the present invention.

Figure 7:
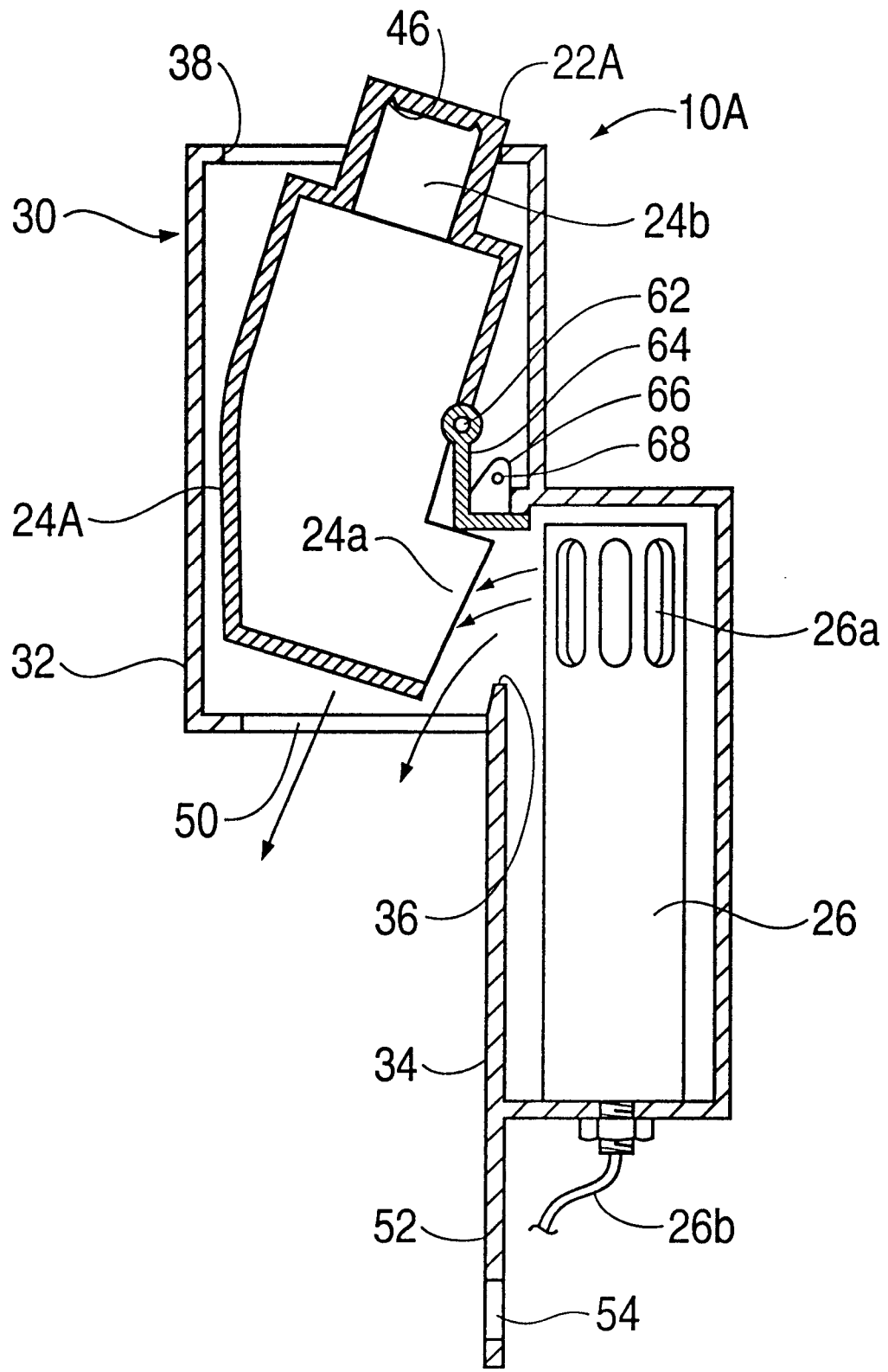

FIG. 7 is a sectional view of the buckle of FIG. 6 when gas is released.

Figure 8:
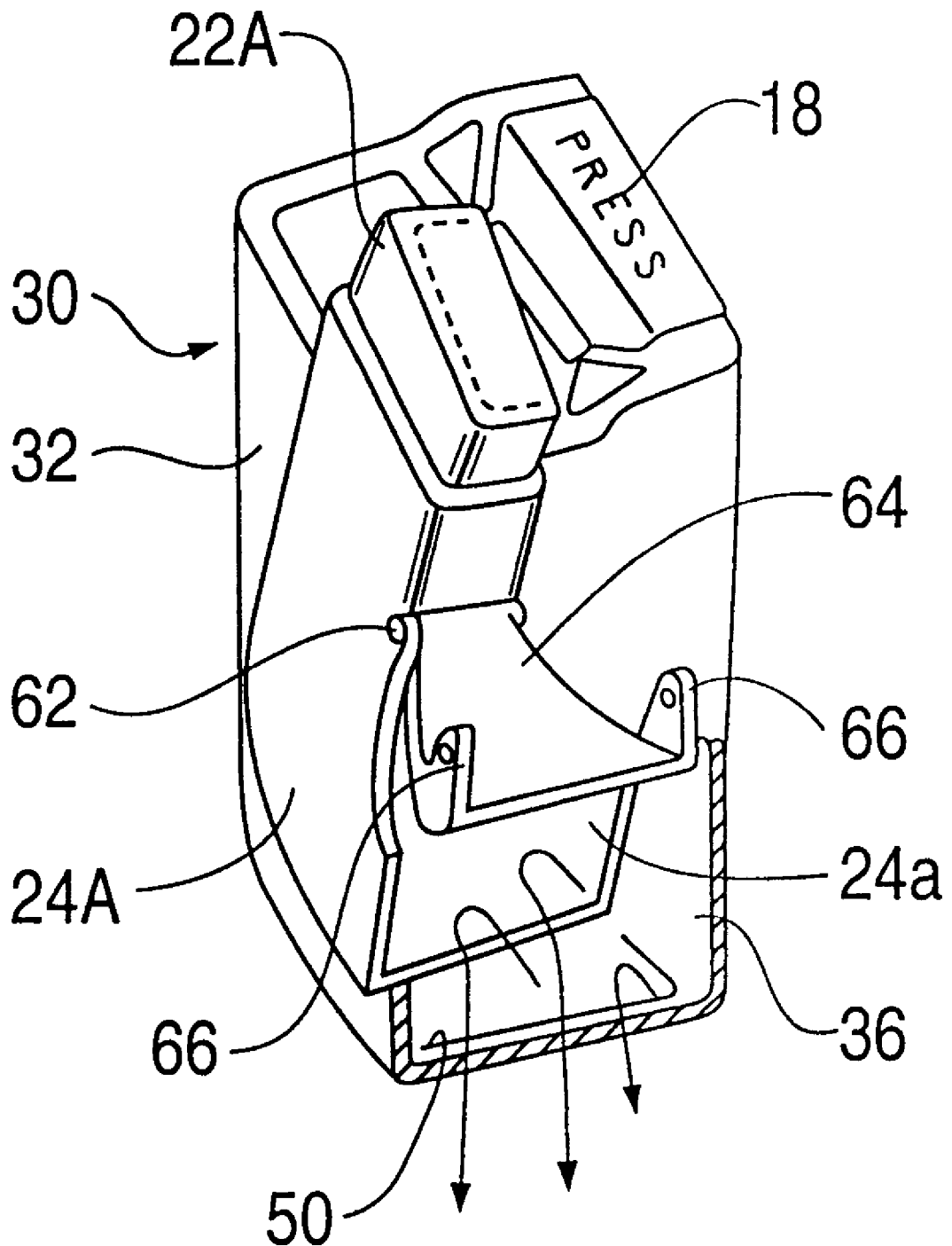

FIG. 8 is a perspective of the inside of the buckle in the same state as FIG. 7.

Figure 9:
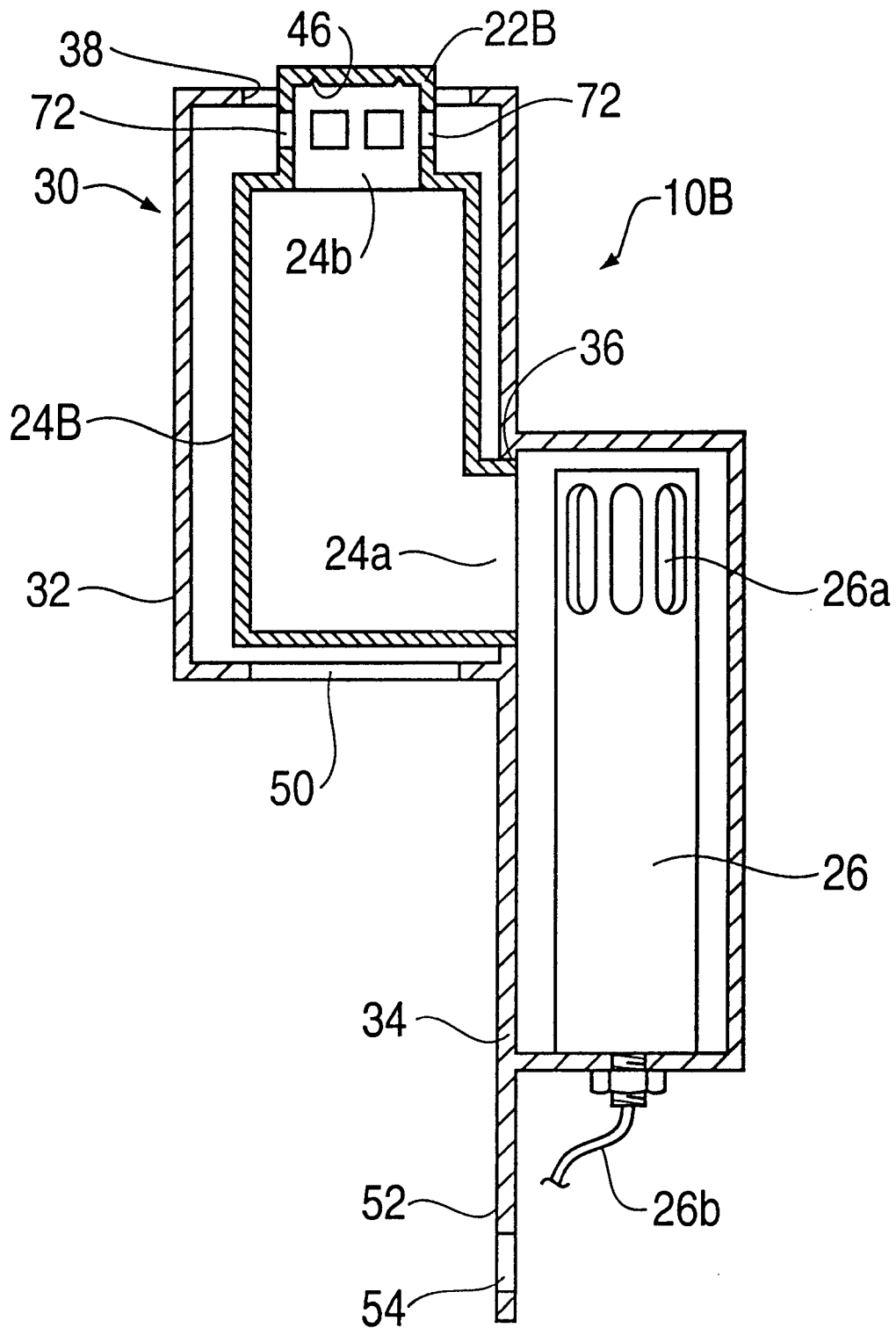

FIG. 9 is a vertical cross sectional view of the buckle of the third embodiment of the present invention.

Figure 10:
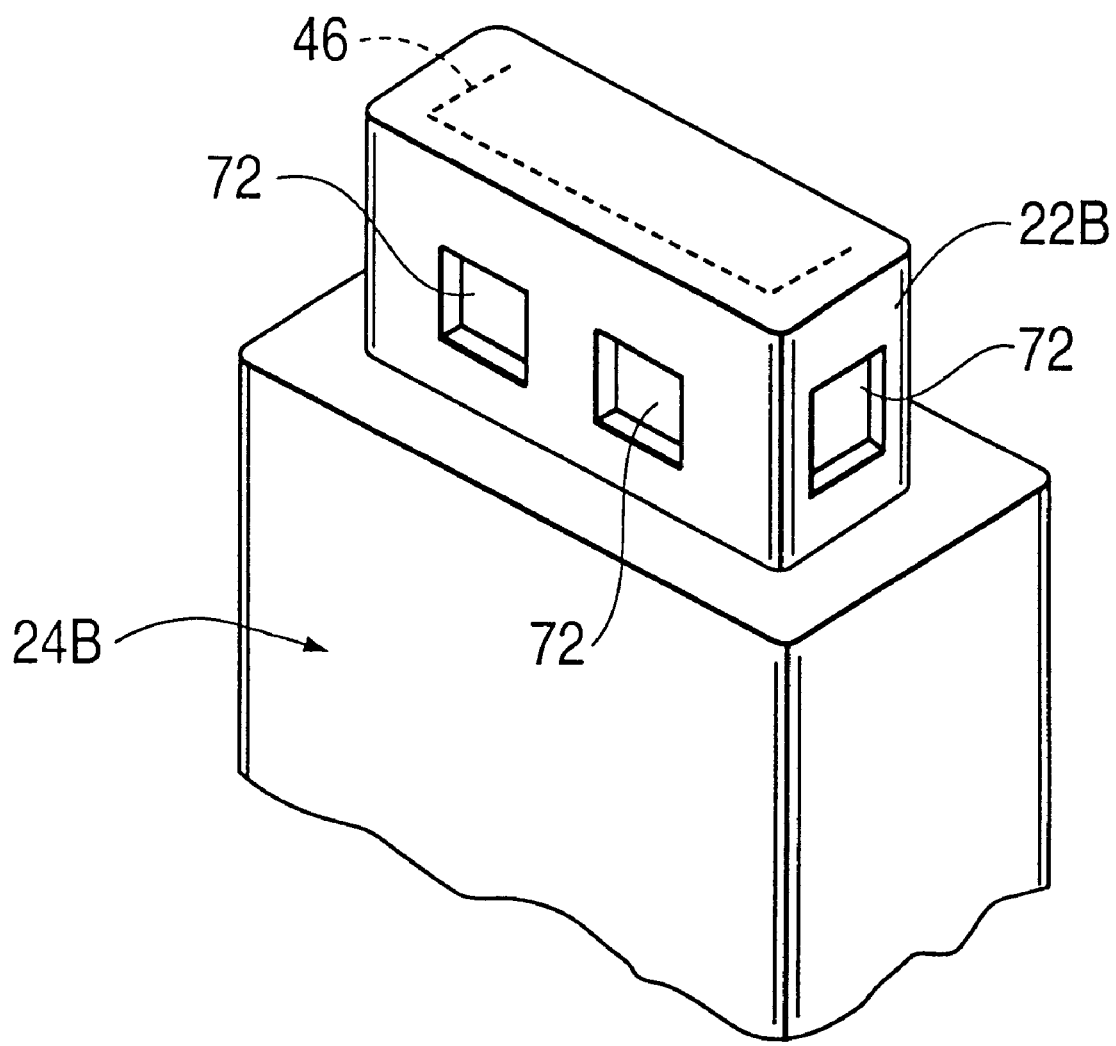

FIG. 10 is a perspective view showing the duct and plug of the third embodiment.

FIG. 11 is a cross sectional view of the primary part of the tongue of the third embodiment in the state fastened to the buckle.

Figure 12A:
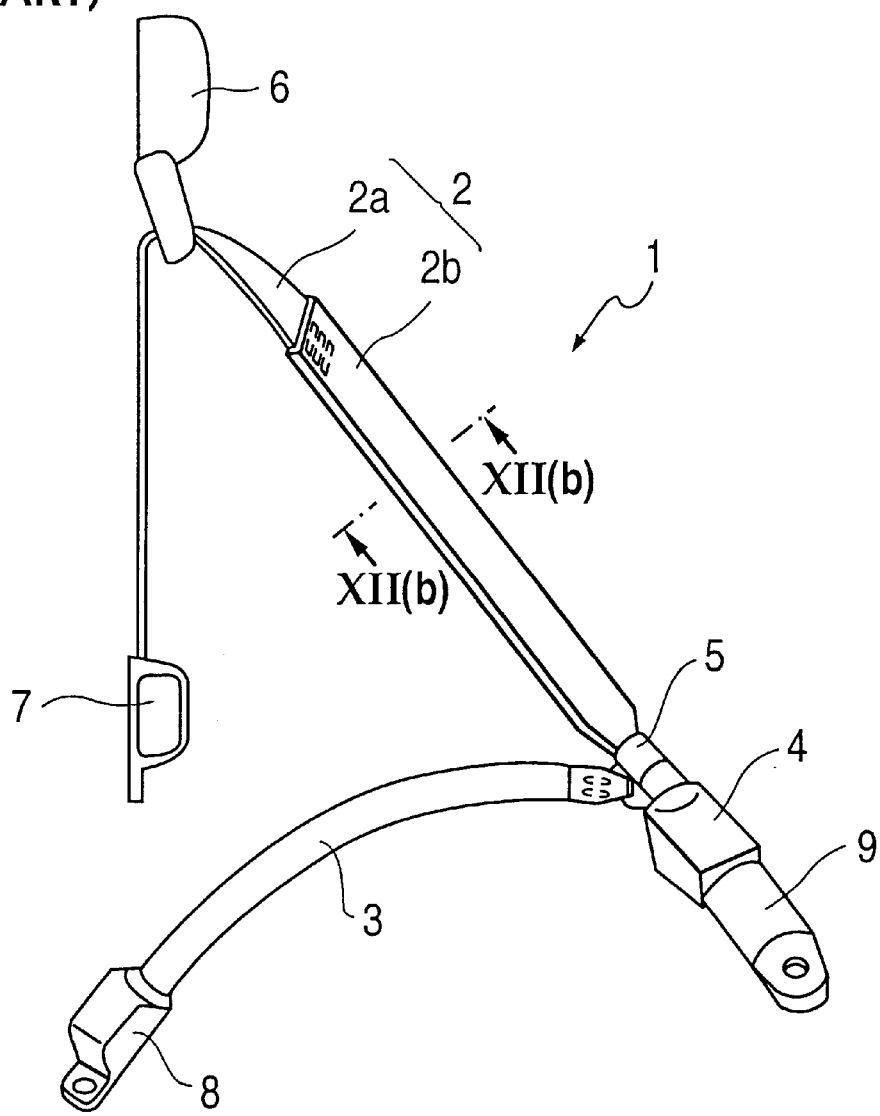
Figure 12B:
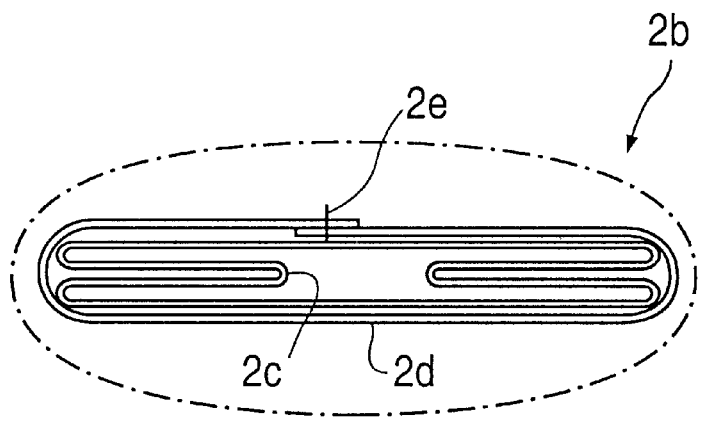

FIGS. 12(*a*) and 12(*b*) show a prior air belt.

DETAILED DESCRIPTION OF THE PREFERRED EMBODIMENT

Figure 1:
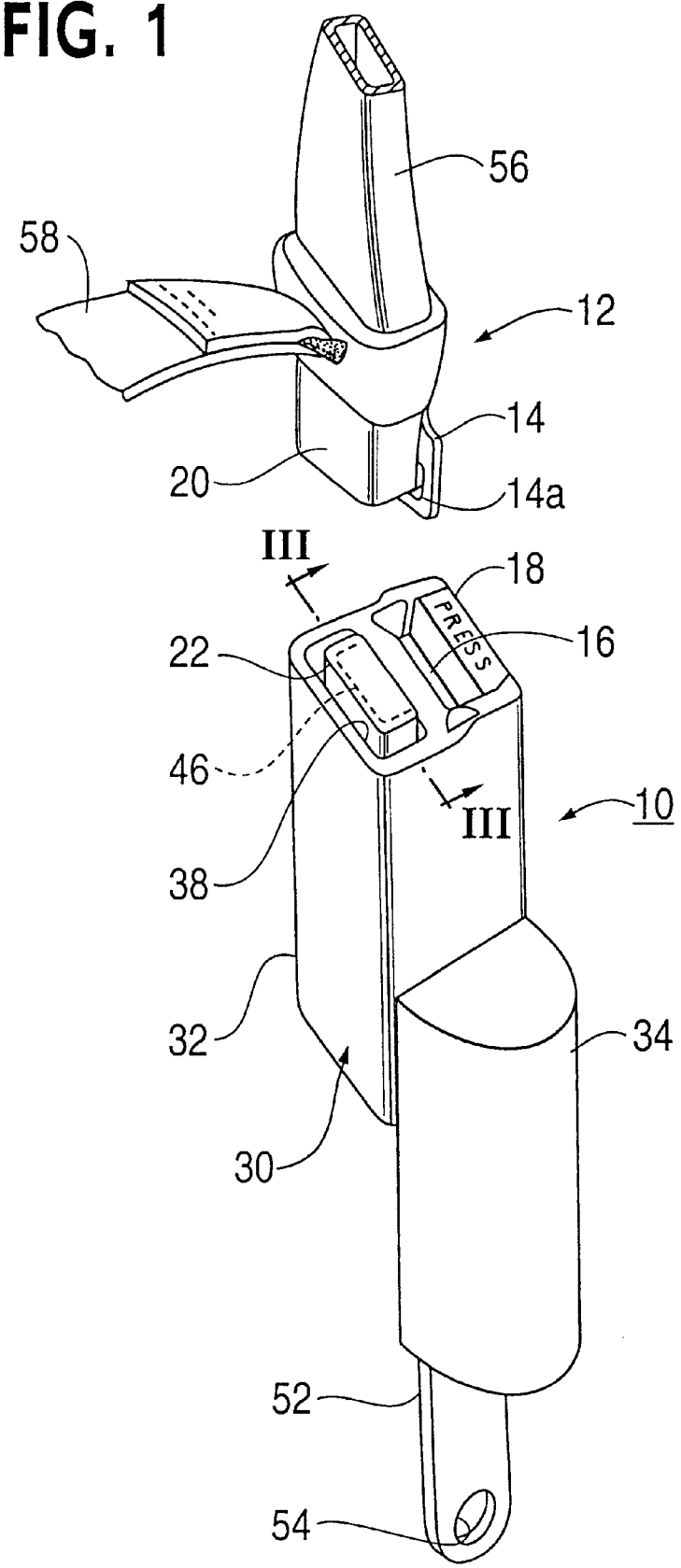
Figure 2:
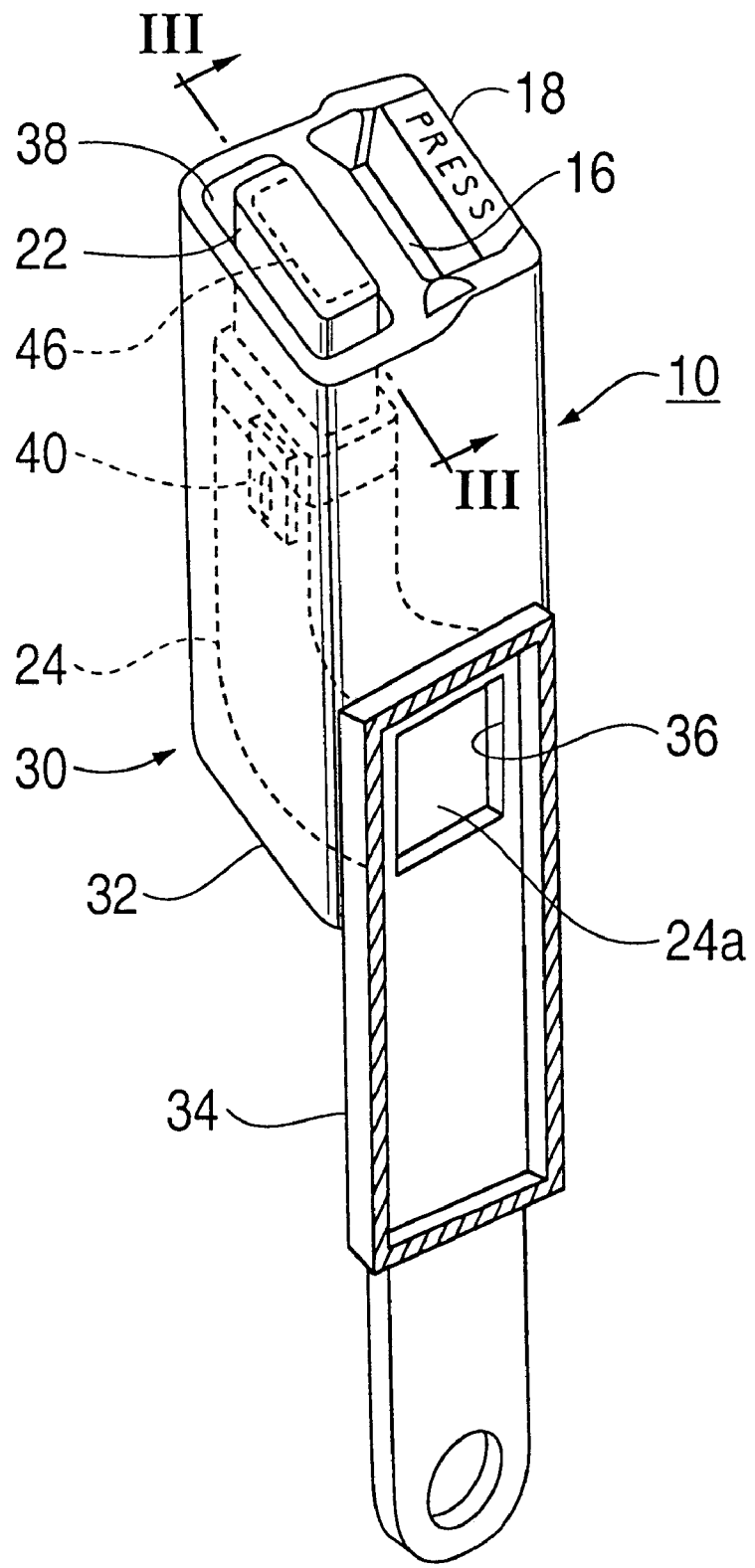
FIG. 2 is a partially sectioned perspective view of the buckle of the first embodiment.
Figure 3:
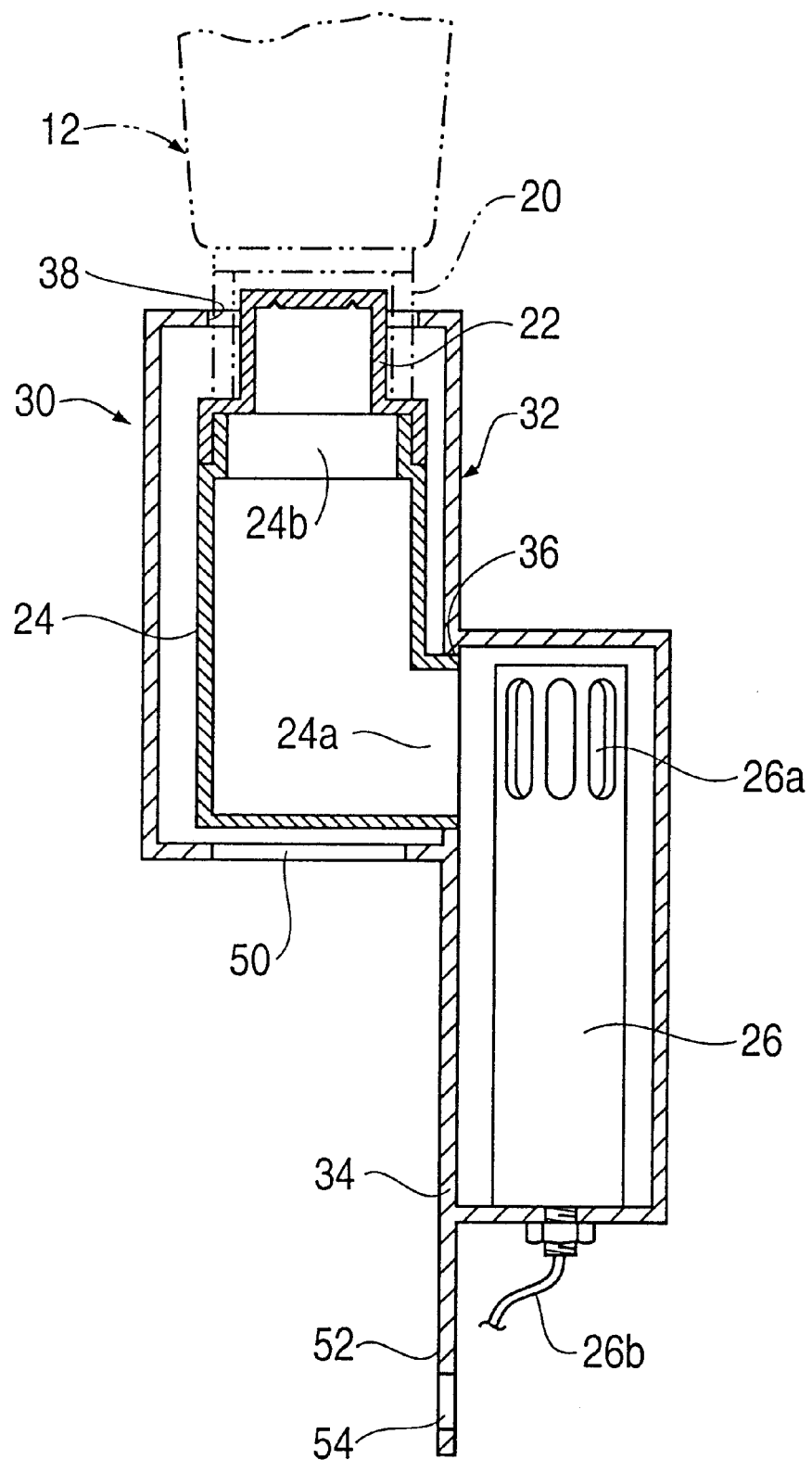
FIG. 3 is a cross sectional view along the line III—III of FIG. 1.

The preferred embodiments of the present invention are described hereinafter by referring to the attached drawings. FIG. 1 is a perspective view of the tongue and buckle of the air belt device of the first embodiment of the present invention. FIG. 2 is a partially sectioned perspective view of the buckle. FIG. 3 is a cross sectional view along the line III—III of FIG. 1 and FIG. 2. FIG. 4 is a cross sectional view of the buckle when gas is released. FIG. 5 shows the perspective views of the plug and duct, wherein FIG. 5 (*a*) shows the plug with the upper end closed and FIG. 5 (*b*) shows the plug with the upper end opened.

The tongue 12 is fastened to the buckle 10 of this air belt device. The buckle 10 is provided with a tongue plate insertion slit 16 into which the tongue plate 14 of the tongue 12 is inserted, a latch mechanism (not shown) in the depth of the tongue plate insertion slit 16, and a press button 18 to reset the latch of the latch mechanism. The buckle 10 comprises a plug 22 onto which the socket 20 of the tongue 12 is inserted from the forward end side, a duct 24 into which the lower end of the plug 22 is inserted, an inflator 26 has a gas generator to supply gas into the duct 24, and a casing 30 which houses the plug 22, duct 24 and inflator 26.

The casing 30 is made in one body with a duct housing 32 which contains the plug 22 and duct 24 and an inflator housing 34 which contains the inflator 26. An opening 36 is provided between these housings 32 and 34. An entrance 24a of the duct 24 is fit to this opening 36.

A socket insertion slit 38 is provided in the upper end of the duct housing 32. The upper end of the plug 22 projects a little over the socket insertion slit 38. The socket 20 is inserted between the internal circumference of the socket insertion slit 38 and the periphery of the plug 22.

The lower end of the plug 22 is fit over an exit 24b of the duct 24 and is movable in the direction of separating away from the duct 24 by the pressure of the gas from the inflator 26. As shown clearly in FIG. 5, the plug 22 has a projection 40 which hangs over the outside of the duct 24. A knob 42 on the outside of the duct 24 fits in a guide hole (elongate hole) 44 of the projection 40, and when the plug 22 moves in the direction of separating away from the duct 24, the movement of the plug 22 is guided by the engagement of the knob 42 with the guide hole 44.

The upper end of the plug 22 is closed but has a tear line 46 buried under the surface. When excessive gas pressure is applied to the upper end of the plug 22, the upper end of the plug 22 breaks along the tear line and a gas ejection port 48 is opened as shown in FIG. 5 (b).

A release port 50 is provided at the bottom of the duct housing 32 of the casing 30. A bracket 52 is provided projecting downward from the inflator housing 34. The bracket 52 has a bolt hole 54. A bolt (not shown) is inserted into the bolt hole 54 to fasten the buckle 10 to the vehicle body member (not shown).

A bag-like shoulder belt 56 is connected to the tongue 12. The inside of the shoulder belt 56 leads to the inside of the socket 20. The wrap belt 58 is also fastened to the tongue 12.

In the air belt device comprising the buckle 10 and tongue 12 constructed as above described, a tongue plate 14 is inserted into the tongue plate insertion slit 16 to fasten the tongue 12 to the buckle 10. At this time, as shown in FIG. 3, the socket 20 is inserted into the socket insertion slit 38 and at the same time it is fit over the plug 22. When the tongue plate 14 is inserted deeply enough into the tongue plate insertion slit 16, the latch claw of the latch mechanism fits into the latch hole 14a of the tongue plate 14, and the tongue 12 can not separate from the buckle 10. When a press button 18 is depressed, the latch claw comes off from the latch hole 14a, the tongue plate 14 is pushed upward by the spring force (not shown) and the tongue 12 separates from the buckle 10.

If a vehicle crushes and the inflator 26 ejects gas in the state the tongue 12 is fastened to the buckle 10, the gas ejected from the gas ejection port 26a of the inflator rushes into the duct 24 through the duct entrance 24a that is fit to the opening 36 and applies a large pressure to the upper end of the plug 22. In this case, as the socket 20 holds down the plug 22 as shown in FIG. 3, the plug 22 can not move upward, the tear line 46 is broken by the gas pressure and the gas ejection port 48 is opened. Thus, the gas from the inflator 26 is supplied into the bag-like shoulder belt 56 passing through the gas ejection port 48 and socket 20, whereby the bag-like shoulder belt 56 is inflated.

If the inflator 26 is activated accidentally and ejects gas in the state the tongue 12 is not fastened to the buckle 10, the gas from the gas ejection port 26a rushes likewise into the duct 24 and applies a large pressure to the upper end of the plug 22. In this case, as the plug 22 is not held down by the socket 20, the plug 22 moves upward as shown in FIG. 4 and a clearance is made between the plug 22 and the upper end of the duct 24. Thus, the gas flowing out of the gas exit 24b of the duct 24 is fed between the duct 24 and the casing 30 through this clearance and is released downward from the release port 50. Since the gas from the inflator 26 is released downward from the release port 50, this prevents a driver from being exposed to a blast of gas.

FIG. 6 is a vertical cross section of the air belt device of the second embodiment of the present invention. FIG. 7 shows the mechanism when the inflator 26 of the buckle malfunctions. FIG. 8 shows a perspective of the inside of the buckle.

In the buckle 10A, the duct 24A and plug 22A are made in one body. The duct 24A has an entrance upper edge 64 which is connected to the duct 24A so as to be rotatable relatively to the duct 24A with a hinge pin 62. The entrance upper edge 64 has a bracket 66 which is fixed to the casing 30 with a rivet 68. The entrance 24a of the duct 24A is fit removable from the opening 36 of the casing 30.

The other configuration of this embodiment is similar to the configuration of the first embodiment, and the same symbols correspond to the same parts.

The tongue 12 (not shown in FIG. 6 and FIG. 7) can be fastened to the buckle 10A that is constructed as above described, and when the press button is depressed, the linkage is released. If the inflator 26 is activated while the tongue 12 is fastened to the buckle, the tear line 46 breaks and the inflator 26 supplies gas into the bag-like shoulder belt 56.

With the socket 20 inserted into the socket insertion slit 38, the socket 20 contacts the internal wall of the socket insertion slit 38 and prevents the duct 24A from inclining so that all the gas from the inflator 26 is supplied to the bag-like shoulder belt 56 through the duct 24A.

If the inflator 26 is activated in the state the tongue 12 is not fastened to the buckle 10A, the duct 24A rotates centering around the pivot hinge pin 62 as shown in FIG. 7 and FIG. 8, whereby the entrance 24a of the duct 24A separates from the opening 36, the opening 36 is directly led to the release port 50, and the gas from the inflator 26 is released downward from the release port 50.

FIG. 9 is a vertical cross sectional view of the buckle of the air belt device of the third embodiment of the present invention. FIG. 10 is perspective view of the duct and plug used in this buckle. FIG. 11 is a cross sectional view of the tongue and buckle fastened to each other.

In this embodiment, the duct 24B and plug 22B are constructed in one body and a gas discharge port 72 is provided on the side of the plug 22B. The other configuration is similar to the first embodiment, and the same symbols correspond to the same parts. Detailed description is omitted.

In the buckle of the third embodiment constructed as above, when the tongue 12 is fastened to the buckle 10B, the socket 20 fits over the plug 22B and closes the gas discharge port 72 in FIG. 11. Thus, if the inflator 26 is activated in this state, the pressure of gas higher than a specified value is applied to the upper end of the plug 22B, the tear line 46 beaks and the gas is supplied to the bag-like shoulder belt 56.

If the inflator 26 is activated in the state the tongue 12 is separated from the buckle 10B, as the gas discharge port 72 is open, the gas is discharged from the gas discharge port 72, fed between the casing 30 and duct 24B and released downward from the release port 50.

In the embodiments described heretofore, the release port 50 is faced down to release the gas from the inflator downward from the casing 30, but the release port can be in the side of the casing to release the gas sideways. It is also obvious that the release port can be tilted down to release the gas obliquely downward.

As described heretofore, according to the present invention, when the gas generator is activated in the state the tongue is not fastened to the buckle, the gas is released downward or sideways.

The accompanying drawings, which are incorporated in and constitute a part of the specification, illustrate a presently preferred exemplary embodiment of the invention, and, together with the general description given above and the detailed description of the preferred embodiment given below, serve to explain the principles of the invention.

This application is one of seven copending applications filed on even date herewith:

| U.S. Ser. No. | Our Docket No. | Japanese No. |
|---|---|---|
| Unknown | 086142/0203 | 09-236903 |
| Unknown | 086142/0204 | 09-236904 |
| Unknown | 086142/0205 | 09-236906 |
| Unknown | 086142/0206 | 09-236907 |
| Unknown | 086142/0207 | 09-236908 |
| Unknown | 086142/0208 | 09-236909 |
| Unknown | 086142/0209 | 09-236910 |

The instant application hereby incorporates by reference the entire specification including claims and abstract and the drawings of each of the other six applications.

What is claimed is:

1. An air belt device including a seat belt for protecting a passenger, said seat belt having at least in a portion thereof an inflatable belt that is connected to a tongue detachably coupled to a buckle, wherein gas is supplied to the inflatable belt from a gas supplying device through gas passages respectively formed within the buckle and the tongue, said air belt device being characterized by a gas discharging port for discharging the gas, supplied from the gas supplying device, to a position below or beside the buckle when the gas supplying device is set in motion in case the tongue is detached from the buckle.

2. An air belt device as set forth in claim 1, characterized in that said gas passage extending within the buckle includes a duct with an inlet and an outlet, and a plug movable away from the inlet of the duct;

said duct is disposed within a casing having a discharge port directed downward or sideward in respect with the casing, said tongue has a socket to receive a plug, said plug is urged by the socket and kept immovable from the duct in a tongue-connecting-state in which the socket receives the plug; and said plug is movable away from the duct based on pressure of the gas supplied from the gas supplying device that is set in motion so that the gas flows between the plug and the duct and is discharged to the discharge port in a tongue-disconnecting-state in which the socket is disengaged from the plug.

3. An air belt device as set forth in claim 1, characterized in that said gas passage of the buckle includes a duct with an inlet and an outlet, and a plug integrally formed with the duct;

said tongue includes a socket fittable in the plug;

said duct is movably disposed within a casing;

said casing includes an opening which the inlet of the duct is engageable with and a discharge port discharging the gas downward or sideward;

said duct is kept immovable within the casing by the restriction of the socket in a tongue-connecting-state in which the socket receives the plug, whereby the inlet of the duct engages the opening of the casing to allow the gas from the gas supplying device to flow into the duct; and said duct moves within a casing based on pressure of the gas so that the inlet of the duct moves away from the opening of the casing to allow the gas from the gas supplying device to flow into the discharge port from the opening in a tongue-disconnecting state in which the socket and the plug are disengaged from each other.

4. An air belt as set forth in claim 1, characterized in that said passage of the buckle includes a duct with an inlet and an outlet, and a plug integrally formed with the duct;

said tongue includes a socket capable of receiving the plug;

said plug includes a gas release port that is closed by the socket when the socket receives the plug; and said duct is disposed in a casing including a discharge port discharging the gas downward or sideward, wherein the gas release port and the discharge port communicate with each other in a tongue-disconnecting-state in the socket when the plug disengages from the duct.

5. An air belt device as set forth in claim 2, characterized in that said plug has a distal end surface that is open when the pressure of the gas acting on the surface is in excess of a predetermined value.

* * * * *